Jan. 27, 1959    R. B. DOME    2,871,357

SAW-TOOTH WAVE GENERATOR

Filed Jan. 18, 1957    2 Sheets-Sheet 1

INVENTOR:
ROBERT B. DOME,
BY Donald N. Timbie
HIS ATTORNEY.

Jan. 27, 1959 R. B. DOME 2,871,357

SAW-TOOTH WAVE GENERATOR

Filed Jan. 18, 1957 2 Sheets-Sheet 2

INVENTOR:
ROBERT B. DOME,

BY Donald H. Tinkle

HIS ATTORNEY.

1

2,871,357

SAW-TOOTH WAVE GENERATOR

Robert B. Dome, Geddes Township, Onondaga County, N. Y., assignor to General Electric Company, a corporation of New York Application January 18, 1957, Serial No. 635,010

10 Claims. (Cl. 250—36)

This invention relates to saw-tooth wave generators and particularly to saw-tooth wave generators used in the scanning systems for cathode ray tubes in television receivers.

In a television receiver a scanning system is provided for the cathode ray tube utilizing two saw-tooth wave generators. One saw-tooth wave generator operates at field frequency to impart vertical motion to the ray and a second saw-tooth wave generator operates at line frequency to impart horizontal motion to the ray. The circuits of the present invention are equally applicable to both saw-tooth wave generators in the scanning system but will be shown particularly as applied to the generation of the saw-tooth wave for imparting horizontal motion to the ray.

There are several types of saw-tooth wave generators now used in television receivers. All of these generators are relatively expensive and utilize a relatively large number of specialized parts. In one type of generator now used two triode tubes are required. In another type of generator now used a blocking oscillator transformer is needed. In still a third type of generator now used a reactance control tube is required to control the frequency of the oscillator.

Accordingly, it is an object of the present invention to provide an improved saw-tooth wave generator suitable for use in the scanning systems of television receivers.

Another object of the invention is to provide a simple and less expensive saw-tooth wave generator of the type set forth which utilizes only a single tube, that tube being a relatively inexpensive pentode tube.

Yet another object of the invention is to provide a saw-tooth wave generator of the type set forth which eliminates the need for a tank circuit or a reactance tube to establish the oscillation frequency thereof, the frequency of oscillation being controlled by the relatively simple means of a D. C. control voltage.

Still another object of the invention is to provide a saw-tooth wave generator of the type set forth which produces an output wave form having a shape properly to excite the horizontal scanning power amplifier.

In connection with the foregoing object it is another object of the invention to provide a saw-tooth wave generator having an output wave form possessing the desirable characteristic of a very rapid discharge cycle, a satisfactorily long duration negative pulse to keep the power amplifier tube cut off when the plate thereof is at a very high positive voltage during fly-back of the ray, and a peak-to-peak amplitude that is equal in magnitude substantially to the D. C. supply to the anode of the saw-tooth wave oscillator.

Yet another object of the invention is to provide a saw-tooth wave generator having an output of sufficient amplitude that the output can drive the output power amplifier directly without further amplification.

Still another object of the invention is to provide a saw-tooth wave generator of the type set forth including circuit elements adjustable to change and adjust the shape of the output wave in order to achieve maximum efficiency in succeeding amplifiers.

A further object of the invention is to provide a saw-tooth wave generator of the type set forth in which the free-running frequency thereof is stabilized against large changes in B plus voltage applied to the oscillator tube.

A still further object of the invention is to provide a saw-tooth wave generator of the type set forth in which the frequency of oscillation can be changed over a relatively wide range, the frequency of the output being controllable by synchronizing inputs thereto over the wide range.

These and other objects and advantages of the invention will be better understood from the following description when taken in conjunction with the accompanying drawings. In the drawings wherein like reference numerals have been utilized to designate like parts throughout:

Figure 7:
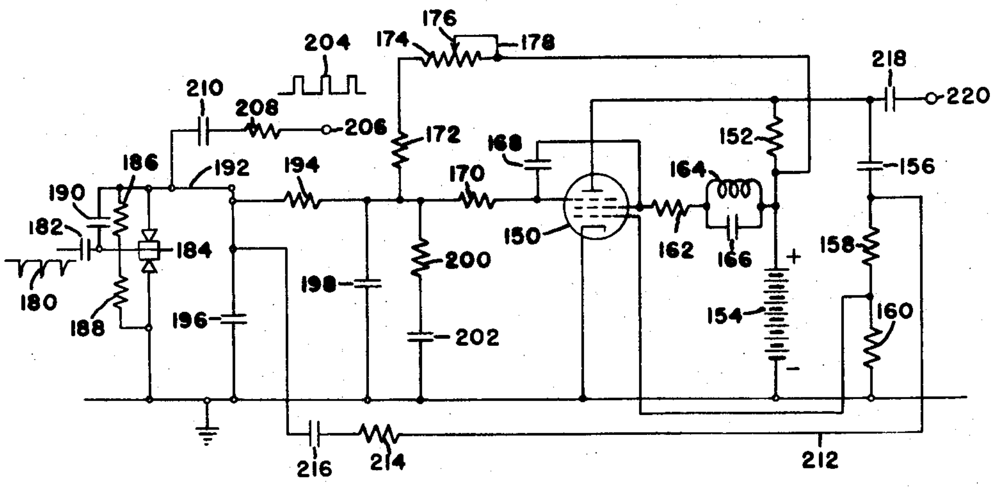
Figure 8:
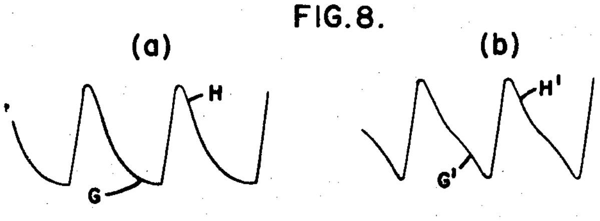

Figure 7 is a schematic electrical diagram of another form of the invention wherein circuit elements have been provided to increase the range of the free-running frequency of oscillation of the circuit that can be controlled by synchronizing pulses; and Figure 8 is a diagram illustrating two different outputs obtainable from the circuit illustrated in Figure 7 by changing certain circuit components therein.

Figure 1:
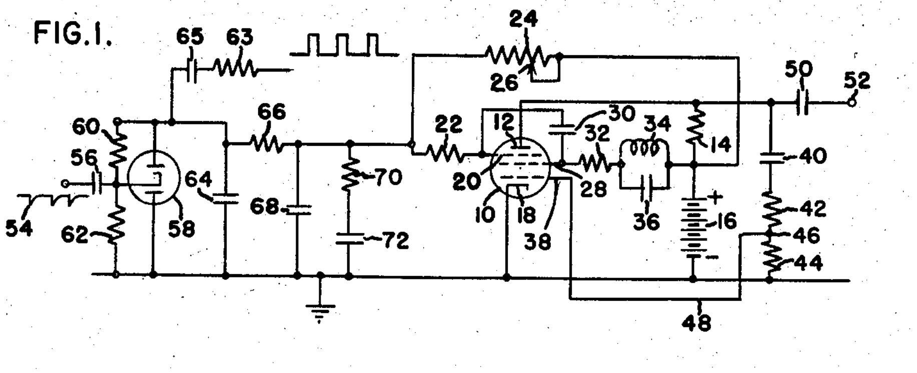
Figure 1 is a schematic electrical diagram of one preferred form of saw-tooth wave generator made in accordance with and embodying the principles of the present invention.

Referring to the drawings and particularly Figure 1 thereof there is shown a schematic diagram of a saw-tooth wave generator circuit made in accordance with and embodying the principles of the present invention. The oscillator of Figure 1 is a modified transitron oscillator or relaxation oscillator. There is provided an oscillator tube 10 which is illustrated as a high vacuum thermionic pentode. Tube 10 may be for example a 6DT6 or 3DT6 or other suitable tube. The plate 12 of tube 10 is connected through a resistor 14 which may have a value of 220,000 ohms to the positive terminal of a source of B plus voltage such as battery 16. When using a 6DT6 tube or similar tube, battery 16 should have an output voltage of approximately 250 volts.

The negative terminal of battery 16 and the cathode 18 of tube 10 are connected together and are in turn connected to ground. The third or suppressor grid 20 of tube 10 is connected to one end of a resistor 22 having a value of 130,000 ohms. Resistor 22 has the other end thereof connected to one end of a rheostat 24 having a movable contact 26 thereon and through rheostat 24 to the positive terminal of battery 16. Coupling between the second or screen grid 28 of tube 10 and the third grid 20 is provided by means of a coupling capacitor 30 having a value of 400 mmf. The second grid 28 is also connected to the positive terminal of battery 16 through a resistor 32 having a resistance of 10,000 ohms and a stabilizing tank circuit including a coil 34 and a capacitance 36, capacitance 36 having a value of 0.01 mf.

A discharge path for the plate 12 is provided by a RC circuit including a capacitor 40 having a value of 100 mmf., a resistor 42 having a value of 47,000 ohms and a resistor 44 having a value of 2700 ohms. One terminal of capacitor 40 is connected to plate 12, the other terminal to one end of resistor 42 which has the other end thereof connected to one end of resistor 44, and the other end of resistor 44 is grounded. The first or control grid 38 of tube 10 is connected to the junction 46 between resistors 42 and 44 through a line 48 to provide feed-back coupling from plate 12 to grid 38.

The circuit described above operates as a free-running transitron or relaxation oscillator. The output from the oscillator is taken from plate 12 through a blocking capacitor 50 connected to a terminal 52, the output signal appearing between terminal 52 and ground.

Figure 3:
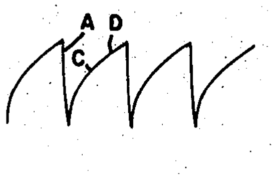
Figure 3 is a diagram of one form of output wave that can be obtained from the circuit of Figure 1.
Figure 4:
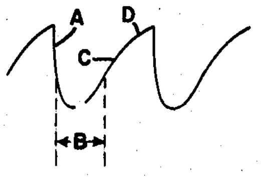
Figure 4 is a diagram of another form of output wave obtainable as an output from the circuit of Figure 1.

By changing the value of resistor 44 with respect to capacitor 40 and resistor 42, it is possible to vary the width of the negative going portion of the output wave appearing between terminal 52 and ground. Referring to Figures 3 and 4 of the drawings there is shown two different outputs obtainable from the oscillator by changing the value of resistor 44. In Figures 3 there is shown the output wave which is obtained if the value of resistor 44 is zero. The wave form illustrated in Figure 4 is that obtained by making the value of resistor 44 high. The interval B of the lower portion of the wave form of Figure 4 can be varied from zero as illustrated in Figure 3 to that shown in Figure 4 by changing the value of resistor 44 in relation to capacitor 40 and resistor 42.

An important feature of the wave forms in both Figures 3 and 4 is the fact that in the region A which includes about the first half of the negative-going portion of the wave form, the time required for discharge is approximately the same and this discharge time is very short. When battery 16 has an output voltage of 250 volts as illustrated above, the first hundred volts of discharge in portion A of the output wave forms occurs in less than one microsecond.

The curvature of the output wave forms at the points marked C and D in Figures 3 and 4 can be controlled by adjusting the value of the plate charging resistor 14. If resistor 14 has a high value, the wave form tends to become linear in the regions C through D. If resistor 14 is relatively low in value, the rise is faster in region C and flattens in region D, i. e., the wave form exhibits considerable curvature in the charging portion of the wave form. A similar effect on the shape of the wave form can be obtained by varying the discharge circuit capacitor 40 and the resistors 42 and 44. If it is desired further to change the wave form in region B, a capacitor may be connected between ground and the junction of capacitor 40 and resistor 42.

The free-running frequency of the oscillator of Figure 1 can be changed or controlled by varying substantially any of the circuit elements. However, the circuit elements associated with the plate circuit 12 have least effect. The greatest effects in the free-running frequency of the oscillator are obtained by varying the coupling capacitor 30 or the rheostat 24.

It is for this reason that rheostat 24 is provided instead of a fixed resistance. In the circuit illustrated rheostat 24 serves as a manual control to change the free-running frequency of the oscillator.

In a television receiver it is necessary that operation of the saw-tooth wave oscillator be synchronized with the incoming picture signal. To this end a horizontal phase detector is provided. A series of synchronizing pulses 54 are fed through a coupling capacitor 56 to a phase detector circuit including a dual diode 58 having a resistor 60 connected between the cathode and one plate thereof and a resistor 62 connected between the cathode and the other plate thereof. Coupling capacitor 56 is connected to the cathodes of tube 58 which is also the junction of resistors 60 and 62. One of the plates of tube 58 is grounded as is the connected end of resistor 62. A series of fly back pulses is fed to the phase detector at the junction of resistor 60 and one of the plates thereof through resistor 63 connected in series with a blocking capacitor 65. The phase detector developes a d. c. voltage across a capacitor 64 conected between the plates of tube 58. Resistor 63 in conjunction with capacitor 64 forms an integrating circuit. The d. c. voltage developed across capacitor 64 by detection is fed through a filter resistor 66 to the junction between resistor 22 and rheostat 24 and through resistor 22 to the third grid 20 of tube 10. A filter in the form of a shunt capacitor 68 is provided at the junction of resistors 22 and 66 and an anti-hunt circuit is also connected between this junction and ground, the anti-hunt circuit including a resistor 70 connected in series with a capacitor 72.

In addition to serving as a frequency control, rheostat 24 acts as a bleeder to counteract the effect of grid current in tube 10 to prevent interference with proper operation of the phase detector. Capacitor 68 shunts rheostat 24 in effect and thereby removes any high voltage radio frequency signals from this circuit element. Rheostat 24 therefore can be located at any convenient place on the chassis and can be used as a manual "hold" adjustment for the television receiver.

The illustrative values of the circuit components set forth above are exemplary of those useful in producing a 15.75 kilocycle saw-tooth wave having a desirable wave shape. It is to be understood that these values are given only by way of illustration and that other values can also be used and in certain cases will be preferred because of other related design considerations. In operation the circuit described having the circuit values indicated operates in a highly satisfactory manner. The total D. C. current drain from battery 16 is approximately 12 milliamperes of which about 0.5 milliampere is plate current through tube 10. The amplitude of the output wave between terminal 52 and ground is about 240 volts peak-to-peak which is almost as great as the B plus supply from battery 16. The discharge time is less than a microsecond and the first 100 volts of the negative going wave in the region A in Figures 3 and 4, and the length of region B of the wave form measured 100 volts down from the top of the wave was about 12 microseconds.

An important feature of the circuit of Figure 1 lies in the fact that the D. C. control voltage for the saw-tooth wave generator is applied to the third grid 20. This connection permits one of the diode plates of tube 58 in the phase detector to be grounded directly thus eliminating circuit elements and helping to minimize the effect of hum leakage.

Although the tubes 10 and 58 have been illustrated as being contained in separate envelopes, it is contemplated that the electrodes of these tubes may be contained in a single envelope.

Figure 5:
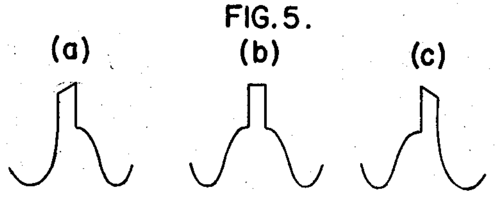
Figure 5 is an illustration of the wave forms obtainable on the second grid of the oscillator tube of Figure 1 at various positions of adjustment of the stabilizing circuit thereof.

The function and adjustment of the stabilizing circuit including coil 34 and capacitor 36 will now be described more fully. It is convenient to adjust this stabilizing circuit by observing the wave form appearing on the second grid 28 of tube 10 by means of an oscilloscope. Diagrams of typical wave forms attained at this point are illustrated in Figure 5 of the drawings. In general the wave form comprises a sine wave which is developed by the tuned stabilizing tank circuit, the sine wave having a positive going pulse riding on the top thereof. The operation of the oscillator is most stable when the wave form has the shape shown in Figure 5(*b*) in which the positive going pulse is centered on the peak of the sine wave. When a wave form as shown in Figure 5(*a*) is obtained on the second grid of tube 10, the inductance of coil 34 is too large. With the circuit adjusted in this manner the output oscillations between point 52 and ground are steady but there is noticeable lack of stabilization. When the stabilization wave form on grid 28 has the shape shown in Figure 5(*c*), the inductance of coil 34 is too low and the oscillations in the output are unsteady near the point of loss of synchronization. The inductance of coil 34 is adjusted with contact 26 of rheostat 24 at the midpoint of the range of operation thereof, the inductance of coil 34 being adjusted to obtain a wave form on grid 28 as shown in Figures 5(*b*). Thereafter all changes in synchronization are obtained by changing the position of contact 26 on rheostat 24. With the oscillator adjusted as described above, substantial changes in the voltage of battery 16 can occur without loss of synchronism. The pull-in range of the oscillator using rheostat 24 as the adjusting member is approximately 90 cycles per second from either side of synchronism and is symmetrical.

Figure 2:
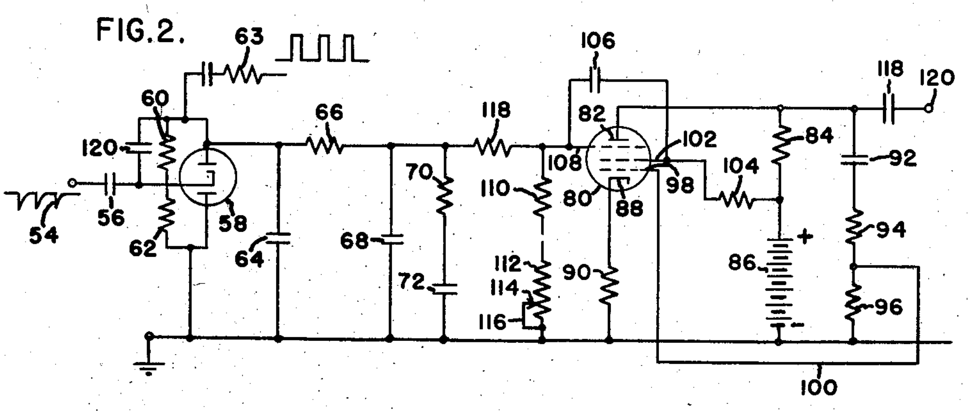
Figure 2 is a schematic electrical diagram illustrating a second embodiment of the invention wherein only resistances and capacitances are used in the oscillator circuit and wherein circuit components are included to stabilize the frequency of the oscillator even though there are large changes in the B plus voltages applied to the oscillator tube.

In certain instances it is desirable to provide a saw-tooth wave generator using only resistances and capacitances as circuit elements thereby eliminating more expensive circuit elements and reducing the cost of the oscillator. Such a circuit is illustrated in Figure 2 of the drawings, this circuit incorporating the principles of the present invention therein. It is to be noted that this circuit eliminates the tuned stabilizing tank circuit including coil 34 and capacitor 36 of Figure 1. When the stabilizing tank circuit is eliminated, the free-running frequency of the oscillator is more dependent upon the resistance value of the resistor connected to the third grid and the value of the coupling capacitor interconnecting the second and third grids. The frequency of oscillation is also more dependent upon the characteristics of the oscillator tube and upon the stability of the B plus voltage applied thereto as it effects the internal impedance of the oscillator tube. The most important of these factors which need be controlled by proper circuit arrangements is that of compensating against the effects of B plus changes on the frequency of operation of the oscillator.

Referring to Figure 2 of the drawings, there is shown a circuit utilizing only resistances and capacitances as circuit elements in addition to the oscillator tube in the saw-tooth wave generator and incorporating suitable compensation for changes in the B plus supply for the oscillator tube. The oscillator tube 80 has the plate 82 thereof connected through a resistor 84 having a value of 220,000 ohms to the positive terminal of a B plus supply in the form of a battery 86. The negative terminal of battery 86 is grounded. The cathode 88 of tube 80 is connected through a cathode resistor 90 having a value of 150 ohms to ground. A discharge path for plate 82 is provided through a capacitor 92 having a value of 100 mmf. in series with a first resistor 94 having a value of 47,000 ohms and a second resistor 96 having a value of 27,000 ohms, one end of resistor 96 being connected to ground.

The first or control grid 98 of tube 80 is connected through a line 100 to the junction between resistors 94 and 96. The second or screen grid 102 of tube 80 is connected through a resistor 104 having a value of 9,000 ohms to the positive terminal of battery 86. A coupling capacitor 106 is also provided connecting the second grid 102 to the third or suppressor grid 108, capacitor 106 having a value of 220 mmf. The third grid 108 is also connected to ground through a pair of series resistances including a resistor 110 and a rheostat 112. Resistor 110 has a value of 100,000 ohms and the rheostat 112 has a maximum resistance of 75,000 ohms. A contact 114 is provided on rheostat 112 to by-pass a portion thereof if desired through a line 116. The third grid 108 is also connected through a resistor 118 having a value of 170,000 ohms to the phase detector network.

The phase detector network of Figure 2 is substantially identical with that of Figure 1 and, accordingly like reference numerals have been applied to like parts.

There has been added to the phase detector a balancing capacitor 120 connected across the detector load resistance 60. The phase detector circuit is operative to deliver through resistor 118 to the third grid of tube 80 a D. C. control voltage.

The operation of the oscillator circuit of Figure 2 is substantially like that of the circuit illustrated in Figure 1. The rheostat 112 can serve as a manual "hold" control. The circuit arrangement illustrated is operative to maintain the frequency of oscillation stabilized although the stabilizing tank circuit of Figure 1 has been eliminated. This circuit furthermore is stable in operation even though there are substantial changes in the B plus voltage applied to oscillator tube 80. For example if the voltage applied to plate 82 changes from a normal value of 150 volts to 200 volts, the frequency of oscillation of the circuit will change only 20 cycles per second from the normal line scanning frequency of 15,750 cycles per second. This is believed to result in a large measure from the presence of the cathode resistor 90 on the circuit and the change in the connection of the third grid 108. If the cathode resistor 90 is eliminated the same 50 volt change in B plus applied to plate 82 causes a change in the operating frequency of the oscillator of 400 cycles per second. This latter change in frequency is in excess of the pull-in range of the manual "hold" control rheostat 112 and therefore would result in a loss of synchronization. On the other hand, the 20 cycle per second change obtained when resistor 90 is in the cathode circuit of tube 80 is well within the pull-in range available with rheostat 112.

Figure 6:
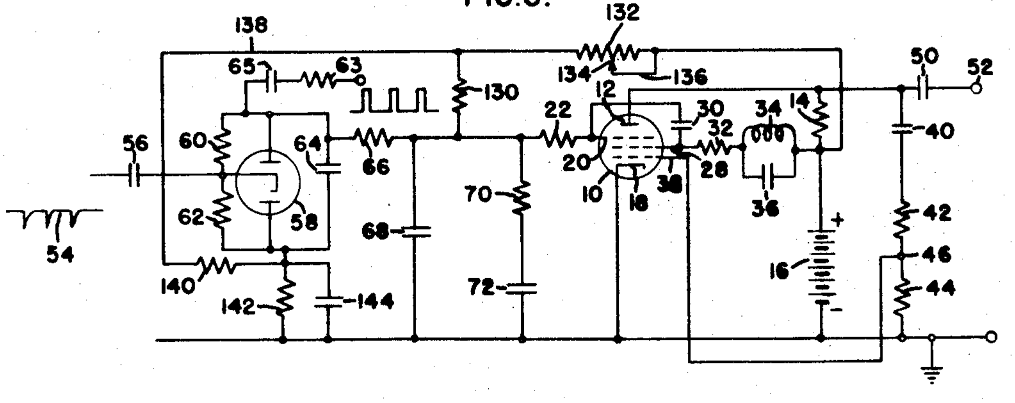
Figure 6 is a schematic electrical diagram of another embodiment of the invention wherein another form of circuit has been provided to stabilize the frequency of the output wave form against changes in B plus voltage applied to the oscillator tube.

There is shown in Figure 6 of the drawings another circuit useful in stabilizing the output of the oscillator against changes in B plus voltage when utilizing the stabilizing tank circuit of Figure 1. In general the circuit of Figure 6 is like the circuit of Figure 1 and, accordingly, like reference numerals have been applied to like circuit elements.

The changes made in the circuit of Figure 6 are in the connection of the third grid 20 of the oscillator tube and in the connection of the phase detector load resistor 62 and the associated plate of tube 58. The third grid 20 is connected to a resistor 22 and resistor 22 is connected through a relatively high resistance 130 to a rheostat 132 connected to the positive terminal of battery 16. Rheostat 132 is provided with a movable contact 134 movable therealong and connected with a line 136 effective to shunt a portion of the resistance of rheostat 132. The junction between resistor 130 and rheostat 132 is connected by a line 138 to one end of a resistor 140. The other end of resistor 140 is connected to the junction between resistance 62 and the associated plate of tube 58. This junction is in turn connected to ground through a resistor 142. A capacitor 144 is connected in parallel with resistor 142 to by-pass alternating currents present in the circuit arising from the input pulse voltages applied to the phase detector.

In the oscillator circuit of Figure 1 a decrease in the B plus voltage applied to tube 10 causes an increase in the free-running frequency of the oscillator and an increase in the B plus voltage applied to tube 10 results in a decrease in the frequency of operation of the oscillator. The circuit of Figure 6 can be adjusted substantially to eliminate any change in free-running frequency of the oscillator even though there are substantial changes in the B plus voltage applied to oscillator tube 10.

The above described stabilization of the frequency of operation even when there are large changes in the B plus voltage applied to tube 10 is believed to result at least in part from connecting the third grid 20 to a positive potential derived by a voltage division of the B plus voltage itself. The voltage divider network includes the rheostat 132, and the resistor 140 and the resistor 142.

In order that the operation of the phase detector remain undisturbed, the connection between load resistor 62 and the associated plate of tube 58 is connected to the junction of resistors 140 and 142. The values of the various resistors are so chosen that the flow of current through filter resistor 66 is substantially zero while at the same time maintaining the potential at the junction between resistors 22 and 130 at a positive value. A stabilizing and compensating voltage directly proportional to the change in the voltage applied to plate 12 is applied to the third grid 20.

It has been found that a positive potential of about 15 volts at the junction of resistors 22 and 130 gives a satisfactory degree of stabilization. The free-running frequency of the saw-tooth wave generator changes less than 10 cycles per second out of 15,750 cycles per second when the value of the voltage of the positive terminal of battery 16 changes 50 volts out of 250 volts in either direction.

The rheostat 132 can still be used as a manual "hold" control. As the value of the resistance of rheostat 132 is changed, the potential at the junction of resistors 140 and 142 changes simultaneously with the change in the potential at the junction of resistors 22 and 130 and in the same direction thereby to keep the current flow through resistor 66 at a low value.

Referring to Figure 7 of the drawings, there is shown a modification of the invention in which the pull-in range has been substantially increased. The circuit comprises a high vacuum thermionic pentode 150 utilized as the oscillator tube, tube 150 being a 3DT6. The plate of tube 150 is connected through a resistor 152 having a value of 240,000 ohms to the positive terminal of a battery 154. The negative terminal of battery 154 and the cathode of tube 150 are connected together and grounded. A discharge circuit for the plate of tube 150 is provided through a series circuit including capacitor 156 having a value of 220 mmf. connected in series with a resistor 158 having a value of 22,000 ohms and a resistor 160 having a value of 3,300 ohms, the lower end of resistor 160 being connected to ground.

The first or control grid of tube 150 is connected to the junction between resistors 158 and 160. The second or screen grid of tube 150 is connected to one end of a resistor 162 having a value of 10,000 ohms. The other end of resistor 162 is connected to the positive terminal of battery 154 through a stabilizing tank circuit including a coil 164 in parallel with a capacitor 166. The second grid is also connected through a coupling capacitor 168 having a value of 220 mmf. to the third or suppressor grid of tube 150.

The third grid of tube 150 is in addition connected through a resistor 170 having a value of 160,000 ohms to one end of a dropping resistor 172 having a value of 470,000 ohms. The other end of resistor 172 is connected to the positive terminal of battery 154 through a rheostat 174. The maximum resistance of rheostat 174 is 2 megohms. A movable contact 176 connected through a line 178 to one end of the resistance of rheostat 174 is provided.

A D. C. control voltage is also applied to the third grid of tube 150 from phase detector circuit. More specifically a series of synchronizing pulses 180 is fed through a coupling capacitor 182 to a phase detector including a pair of selenium rectifiers 184. A first load resistor 186 is connected across one of the rectifiers 184 and a second load resistor 188 is connected across the other. The coupling capacitor 182 is connected to the junction of resistors 186 and 188. Preferably the coupling capacitor 182 has a value of 100 mmf., resistor 186 has a value of 680,000 ohms and resistor 188 has a value of 560,000 ohms. A balancing capacitor 190 having a value of 82 mmf. is connected across load resistor 186.

The lower end of resistor 188 is connected to ground and the output from the phase detector appears between line 192 and ground. A filter circuit is provided including a resistor 194 having a value of 47,000 ohms connected to line 192 and a pair of by-pass capacitors 196 and 198 connecting the ends of resistor 194 to ground. Capacitor 196 has a value of 470 mmf. and capacitor 198 has a value of 5,000 mmf. An anti-hunt circuit including a resistor 200 having a value of 100,000 ohms connected in series with a capacitor 202 which is connected to ground.

A series of fly-back pulses 204 is fed to the phase detector through a terminal 206 connected to resistor 208 having a value of 470,000 ohms connected in series with a capacitor 210 having a value of 1200 mmf. Capacitor 210 is connected to line 192.

Additional pull-in range is achieved by making a connection to the junction between capacitor 156 and resistor 158 through a line 212 to one end of a resistor 214 having a value of 18,000 ohms. The other end of resistor 214 is connected to one end of a capacitor 216 having a value of 680 mmf. The other end of capacitor 216 is connected to the high potential side of capacitor 196 and more particularly to the junction between resistor 194 and capacitor 196. By this connection the negative going pulse developed across resistors 158 and 160 is fed into the capacitor 196 to improve the reference saw-tooth wave formed from the fly-back pulses 204 that are integrated by resistor 208 and capacitor 196. The output wave from the oscillator is taken through blocking capacitor 218 having a value of 0.0047 mf. to a terminal 220, the ouput wave appearing between terminal 220 and ground.

The circuit of Figure 7 shows substantial increase in the pull-in range on both side of synchronism. In actual test the circuit of Figure 7 has a pull-in range amounting to 240 cycles per second on each of synchronism at a normal operating frequency of 15,750 cycles per second. This increase in the pull-in range is believed to result from reducing the value of the filter resistor 194 and the addition of the feed-back circuit including resistor 214 and capacitor 216 connected from the high potential side of resistor 158 to the high potential side of capacitor 196.

The change in the wave form developed across capacitor 196 is illustrated in Figure 8 of the drawings. The wave forms of Figure 8 are those appearing between ground and the junction of resistor 194 and capacitor 196. In Figure 8(*a*) there is shown the wave form produced by the circuit when the connection through resistor 214 and 216 is reduced. In this wave form the region marked G in Figure 8(*a*) is substantially flatter than the region marked H. The drawing in Figure 8(*b*) is the wave form developed after the addition of the connection through resistor 214 and capacitor 216. In this wave form the region G' has substantially the same shape and slope as the region H', the region G' having been substantially steepend compared with region G of Figure 8(*a*). It is believed that the greater symmetry of the wave form of vacuum 8(*b*) is responsible for the symmetrical pull-in characteristics. It is further believed that reducing the value of resistor 194 also materially contributes to increasing the pull-in range. If resistor 194 in Figure 7 is changed from 47,000 ohms to one megohm, the pull-in range is reduced to about 180 cycles per second.

It will be seen that there has been provided saw-tooth wave generators which fulfill the objects and advantages set forth above. Although several preferred forms of the invention have been shown for purposes of illustration, it is to be understood that various changes and modifications can be made therein without departing from the spirit and scope of the invention. Accordingly, the invention is to be limited only as set forth in the following claims.

What I claim as new and desire to secure by Letters Patent of the United States is:

1. A saw-tooth wave generator comprising an oscillator tube having a cathode and control grid and screen grid and suppressor grid and plate, an impedance and a source of potential serially connected between said plate and said cathode, a discharge circuit for said plate comprising a capacitance and a resistance connected in series between said plate and ground, means to feed a portion of the voltage from said resistance to said control grid, means to apply a positive operating potential to said screen grid, means to apply a positive operating potential to said suppressor grid, and a coupling circuit including a capacitance interconnecting said screen grid and said suppressor grid.

2. A saw-tooth wave generator comprising an oscillator tube having a cathode and control grid and screen grid and suppressor grid and plate, an impedance and a source of potential serially connected between said plate and said cathode, a discharge circut for said plate comprising a capacitance and a resistance connected in series between said plate and ground, means to feed a portion of the voltage from said resistance to said control grid, means to apply a positive operating potential to said screen grid, means to apply a D. C. frequency control voltage to said suppressor grid, and a coupling circuit including a capacitance interconnecting said screen grid and said suppressor grid.

3. A saw-tooth wave generator comprising an oscillator tube having a cathode and control grid and screen grid and suppressor grid and plate, an impedance and a source of potential serially connected between said plate and said cathode, a discharge circuit interconnecting said plate and ground, means to feed a portion of the potential developed across said discharge circuit to said control grid, means including an impedance connected between said screen grid and said source of potential for supplying an operating potential to said screen grid, means to apply a D. C. frequency control voltage to said suppressor grid, and a coupling circuit interconnecting said screen grid and said suppressor grid.

4. A saw-tooth wave generator comprising an oscillator tube having a cathode and control grid and screen grid and suppressor grid and plate, an impedance and a source of B plus potential, said plate and said cathode being connected together through said impedance and said source of B plus potential, a discharge circuit for said plate comprising a capacitance and a resistance connected in series between said plate and ground, means to feed a portion of the voltage from said resistance to said control grid, means to apply a positive operating potential to said screen grid, means to apply a positive operating potential to said suppressor grid, means to change the potential applied to said suppressor grid to control the frequency of operation of the generator, means to apply a D. C. control voltage to said suppressor grid to control the frequency of operation of the generator, and a coupling circuit including a capacitance interconnecting said screen grid and said suppressor grid.

5. A saw-tooth wave generator comprising an oscillator tube having a cathode and control grid and screen grid and suppressor grid and plate, a resistance and a source of B plus potential serially connected to said plate, a discharge circuit for said plate comprising a capacitance and a resistance connected in series between said plate and ground means to feed a portion of the potential developed across said resistance to said control grid, a stabilizing tank circuit interconnecting said screen grid and said source of B plus potential, means to apply an operating potential to said suppressor grid, and a coupling circuit interconnecting said screen grid and said suppressor grid.

6. A saw-tooth wave generator comprising an oscillator tube having a cathode and control grid and screen grid and suppressor grid and plate, an impedance for said plate connected to a source of B plus potential and said plate, a discharge circuit for said plate comprising a capacitance and resistance connected in series between said plate and ground potential, means to feed a portion of the voltage developed across said resistance to said control grid, a resistance connecting said cathode to ground potential, a resistance interconnecting said screen grid and a source of B plus potential, a variable resistance connecting said suppressor grid to ground potential, and a coupling circuit including a capacitance interconnecting said screen grid and said suppressor grid.

7. A saw-tooth wave generator comprising an oscillator tube having a cathode and control grid and screen grid and suppressor grid and plate, a source of B plus potential, an impedance interconnecting said plate and said source of B plus potential, a discharge circuit for said plate comprising a capacitance and a resistance connected in series between said plate and said cathode, a tuned tank circuit interconnecting said screen grid and said source of B plus potential, a voltage divider network connected from said source of B plus potential to ground, said suppressor grid being connected to a point on said voltage divider network whereby a predetermined portion of any change in the B plus potential is applied to said suppressor grid, and a coupling circuit including a capacitance interconnecting said screen grid and said suppressor grid.

8. A saw-tooth wave generator corprising an oscillator tube having a cathode and control grid and screen grid and suppressor grid and plate, a source of B plus potential, an impedance interconnecting said plate and said source of B plus potential, a discharge circuit for said plate comprising a capacitance and a resistance connected in series between said plate and ground potential, means interconnecting said screen grid and said source of B plus potential, a source of D. C. control voltage connected to said suppressor grid, a voltage divider network connected from said source of B plus potential to ground, said source of D. C. control voltage being connected to a point on said voltage divider network whereby a predetermined portion of any change in the B plus potential is applied to said suppressor grid, and a coupling circuit including a capacitance interconnecting said screen grid and said suppressor grid.

9. A saw-tooth wave generator comprising an oscillator tube having a cathode and control grid and screen grid and suppressor grid and plate, a source of B plus potential connected to said plate, a discharge circuit for said plate comprising a capacitance and a resistance connected in series between said plate and ground potential, means to feed a portion of the voltage developed across said resistance to said control grid, means to apply a positive operating potential to said screen grid, a phase detector circuit, a resistor interconnecting said phase detector and said suppressor grid, a capacitor connecting the interconnection between said resistor and said phase detector circuit to ground, a first coupling circuit including a capacitance interconnecting the point of connection of said resistance and capacitance in said discharge circuit and the point of interconnection of said resistor and said phase detector circuit, and a coupling circuit including a capacitance interconnecting said screen grid and said suppressor grid.

10. A saw-tooth wave generator comprising an oscillator tube having a cathode and control grid and screen grid and suppressor grid and plate, a source of B plus potential connected to said plate, a discharge circuit for said plate comprising a capacitance and a resistance connected in series between said plate and ground potential, means to feed a portion of the voltage developed across said resistance to said control grid, means to apply a positive operating potential to said screen grid, a phase detector circuit, a filter resistor interconnecting said phase detector and said suppressor grid, said filter resistor having a low resistance, a first capacitor connecting the interconnection between said resistor and said phase detector circuit to ground, a second capacitor interconnecting the other end of said filter resistor to ground, a first coupling circuit including a capacitance connecting the point of interconnection of said capacitance and resistace in said discharge circuit to the connection of said filter resistor to said phase detector circuit, and a second coupling circuit including a capacitance interconnecting said screen grid and said suppressor grid.

References Cited in the file of this patent

UNITED STATES PATENTS

| | | |
|---|---|---|
| 2,172,746 | Young | Sept. 12, 1935 |
| 2,412,485 | Whiteley | Dec. 10, 1946 |
| 2,456,029 | Snyder | Dec. 14, 1948 |